M. S. WILLIAMS.
ROOFING WASHER AND SCREW.
APPLICATION FILED JAN. 17, 1918.

1,286,862.

Patented Dec. 3, 1918.

Inventor
M. S. Williams
By Fred Walsh
Atty

UNITED STATES PATENT OFFICE.

MONTAGU SYDNEY WILLIAMS, OF MARRICKVILLE, NEAR SYDNEY, NEW SOUTH WALES, AUSTRALIA, ASSIGNOR OF ONE-HALF TO THOMAS ROBERT KIRKLAND, OF MARRICKVILLE, NEW SOUTH WALES, AUSTRALIA.

ROOFING-WASHER AND SCREW.

1,286,862.                   Specification of Letters Patent.       Patented Dec. 3, 1918.

Application filed January 17, 1918. Serial No. 212,328.

*To all whom it may concern:*

Be it known that I, MONTAGU SYDNEY WILLIAMS, a subject of the King of Great Britain, residing at No. 45 Warren road, Marrickville, near Sydney, in the State of New South Wales and Commonwealth of Australia, plumber, have invented a new and useful Improved Roofing-Washer and Screw, of which the following is a specification.

There has always been difficulty in making water tight the fastenings (generally a screw) of sheets (generally corrugated iron sheets) of roofing to the purlins and the devices hitherto used have been more or less unsatisfactory and as the material namely lead of which washers and heads around screws and nails have been made has become costly an efficient substitute for such devices is very necessary.

And this invention refers to an easily made, cheap and effective substitute for the present day washers and heads for screws and nails used for the fastening down of sheets of metal roofing on their support and it relates to a metal washer of peculiar construction which together with the pressure of the screw or nail thereon will make a water tight and rain proof joint.

This improved roofing washer which may be separate from or be associated with the stem of a screw or of a nail consists of a stamped out or otherwise formed plate or sheet metal washer bent in conformity with the shape of the sheet or plate on which it is to rest having an orifice therethrough for the fastening screw or nail and having a collar or neck or throat with a flat upper face around said orifice obtruding above the shaped washer wall and this wall may have a plurality of ridges to strengthen it and which at the same time divide any more or less streams of water from the screw or nail head.

The drawings accompanying and forming part of this complete specification illustrate the now best known utilization and construction of the separate form of this improved roofing washer and of this there may be innumerable varieties as to shape, bend, ridging and material all within the scope of this invention and the ambit of the claims to be hereinafter set forth in respect thereof.

Figure 1:
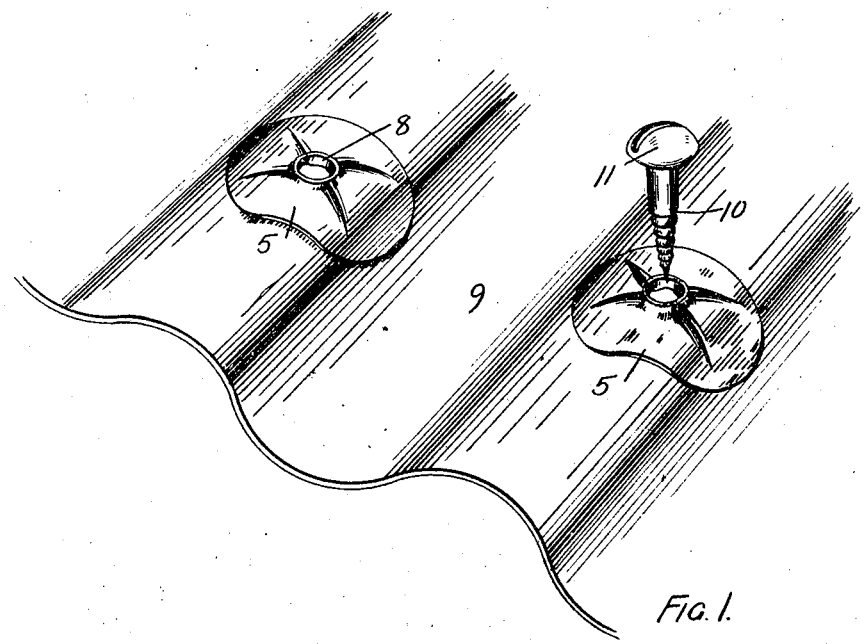
Figure 2:
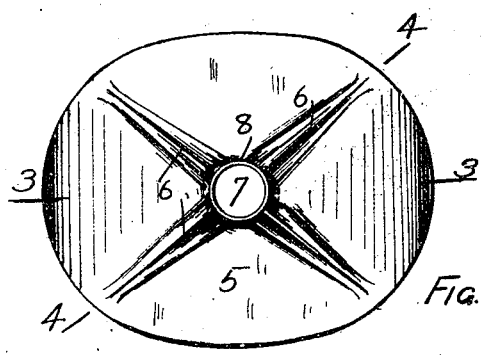
Figure 3:
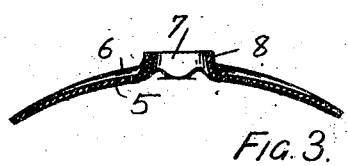
Figure 4:
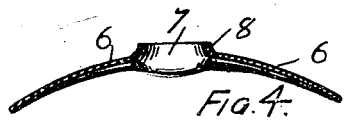

Figure 1 shows two of these improved roofing washers in use in the fastening down of corrugated iron. Fig. 2 is an enlarged plan of said washer and Figs. 3 and 4 cross sectional elevations on lines 3—3 and 4—4 respectively in Fig. 2.

The washer is stamped or otherwise shaped from sheet metal and is of suitable curvature or bend or contour for its ultimate purpose and as shown has a convexo-concave body 5 of oval shape with cross ridges 6 leading from the central orifice 7 around which is the collar or neck or throat 8 with a flat upper face.

In use the washer is placed over the hole in the ridge of the corrugated iron sheet 9 with its orifice 7 in juxtaposition therewith and then the screw 10 (or it may be a headed nail) is inserted as ordinarily and the under face 11 of said screw or nail pressing upon the flat upper face of the collar or throat 8 tightens said washer on the sheet 10 and holds this firmly in place and at the same time makes a water tight and rain-proof joint around the stem of the screw or nail. The ridges 6 as well as strengthening the body 5 divide off the drippings or streams of water from the head of the screw or nail.

What I claim as my invention, and desire to secure by Letters Patent is:

A device for securing roofing comprising a curved sheet metal washer having a centrally disposed upwardly extending neck provided with a flat upper surface, ridges formed in said washer and extending from the neck toward the edge of the washer, and a screw adapted to be passed through said neck and provided with a head to engage the flat face of the neck.

In testimony whereof I have signed my name to this specification in the presence of two subscribing witnesses.

MONTAGU SYDNEY WILLIAMS.

Witnesses:
 PERCY NEWELL,
 I. EASTON.